(12) United States Patent
Bahnck et al.

(10) Patent No.: US 9,204,179 B2
(45) Date of Patent: Dec. 1, 2015

(54) LOCATION-BASED SERVICE GROUP DISCOVERY FOR SWITCHED DIGITAL VIDEO

(75) Inventors: Thomas J. Bahnck, Lafayette Hill, PA (US); David M. Bjordammen, Blue Bell, PA (US)

(73) Assignee: ARRIS Technology, Inc., Suwanee, GA (US)

( * ) Notice: Subject to any disclaimer, the term of this patent is extended or adjusted under 35 U.S.C. 154(b) by 1072 days.

(21) Appl. No.: 12/822,766

(22) Filed: Jun. 24, 2010

(65) Prior Publication Data

US 2011/0321113 A1    Dec. 29, 2011

(51) Int. Cl.
| | |
|---|---|
| *H04N 21/226* | (2011.01) |
| *H04N 21/2668* | (2011.01) |
| *H04N 21/426* | (2011.01) |
| *H04N 21/475* | (2011.01) |
| *H04N 21/258* | (2011.01) |
| *H04N 21/45* | (2011.01) |

(52) U.S. Cl.
CPC ..... *H04N 21/25808* (2013.01); *H04N 21/2668* (2013.01); *H04N 21/4516* (2013.01)

(58) Field of Classification Search
None
See application file for complete search history.

(56) References Cited

U.S. PATENT DOCUMENTS

| | | | |
|---|---|---|---|
| 2002/0007491 A1* | 1/2002 | Schiller et al. | 725/87 |
| 2006/0190964 A1* | 8/2006 | Eldering | H04N 7/165 725/42 |
| 2009/0144797 A1 | 6/2009 | Wang et al. | |
| 2009/0150926 A1 | 6/2009 | Schlack | |
| 2009/0158380 A1* | 6/2009 | Derham | H04N 21/2385 725/131 |

* cited by examiner

*Primary Examiner* — Brian T Pendleton
*Assistant Examiner* — Jean D Saint Cyr
(74) *Attorney, Agent, or Firm* — Stewart M. Wiener

(57) ABSTRACT

A broadcast system and method that includes a video content network that connects a video server, a discovery server, a switched digital video service, a switched video manager, and a set-top box. The set-top box receives and stores an assigned location identifier, and receives a mapping from the discovery server, where the mapping includes records, each record associating a location identifier and a service group. The set-top box matches the assigned location identifier to the mapping to determine an assigned service group for the set-top box. The set-top box receives an address from the discovery server that identifies the switched video manager that is associated with the assigned service group. The set-top box operates in the broadcast system by communicating with the switched digital video service, and the switched video manager.

20 Claims, 2 Drawing Sheets

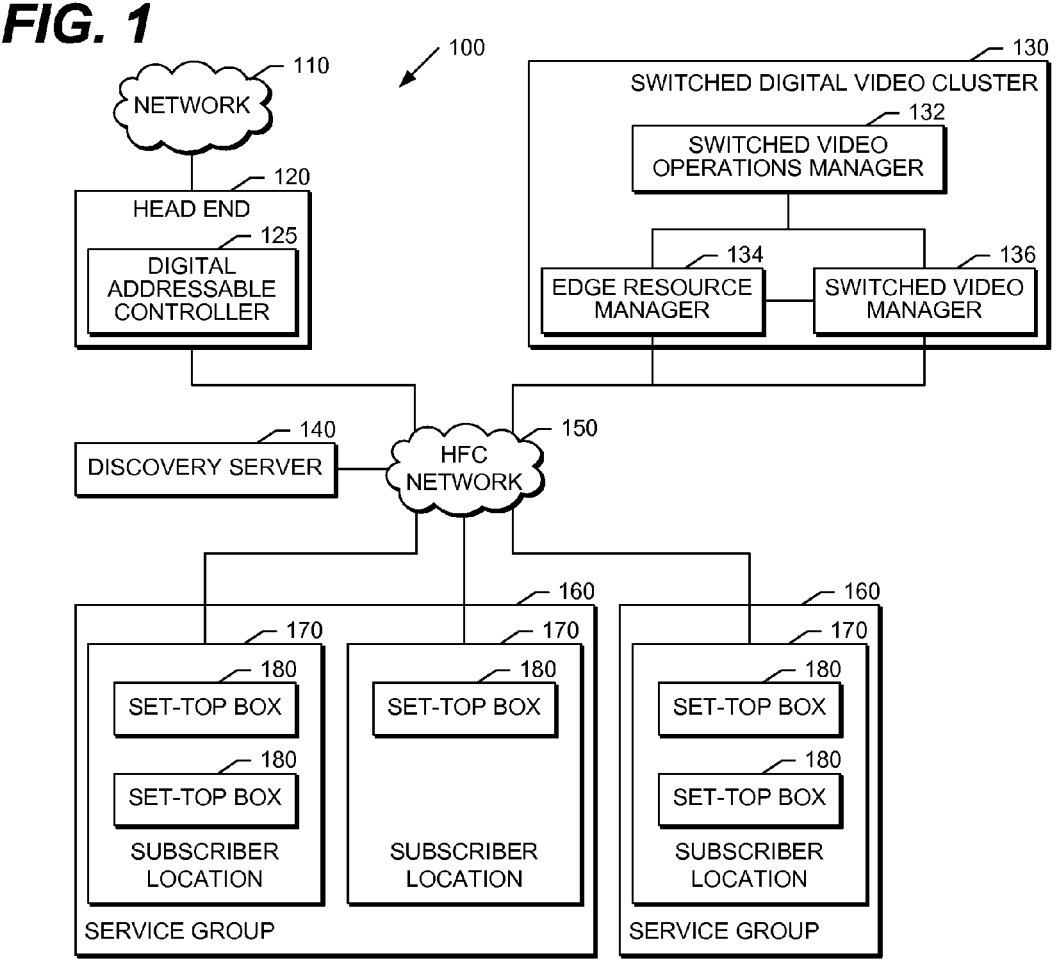
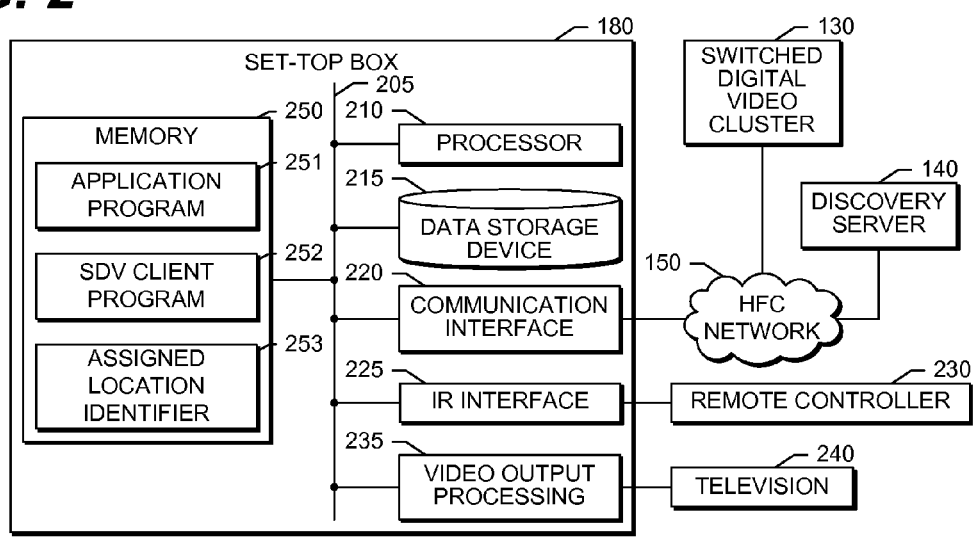

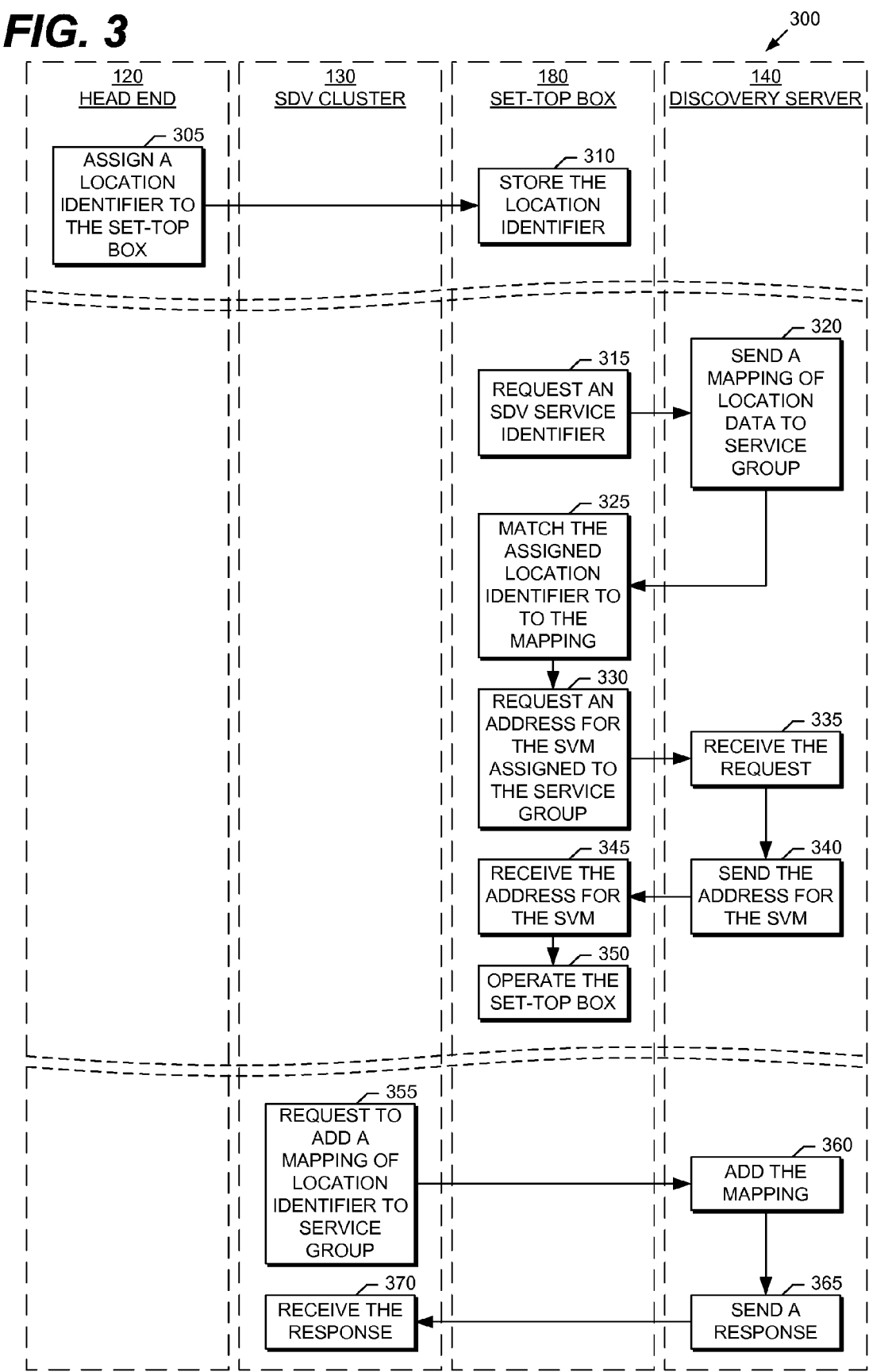

LOCATION-BASED SERVICE GROUP DISCOVERY FOR SWITCHED DIGITAL VIDEO

BACKGROUND

A digital video broadcast system allows a multiple system operator (MSO) to deliver television programs and multimedia services to subscribers. The capacity, or bandwidth, of the system determines the programs and services that the MSO delivers. In legacy broadcast systems, the MSO sends all of the available programs and services to the subscriber's set-top box on a single cable. Thus, the only way to increase the programs and services available to subscribers in legacy broadcast systems is to increase the bandwidth.

Switched digital video is an improvement to the legacy broadcast systems that requires less bandwidth to deliver high-bandwidth digital services by allowing the MSO to send only the content requested by a service group, where each service group includes a set of set-top boxes with visibility to a common set of switched edge quadrature amplitude modulator (QAM) devices. To make this possible, the subscriber's set-top box communicates with a network side video server to request the program that the subscriber wants to watch in real time. The switched digital system responds by delivering the requested program to the subscriber's service group. Thus, the service group only receives the programs that subscribers in the service group are watching. In addition, the switched digital system collects data on the usage of the set-top boxes and reports this data to the MSO.

The assignment of service groups in existing switched digital video standards and protocols uses switched edge QAM devices to determine the service group. These standards do not define a message or method to autonomously segment the set-top box population into service groups, or send the group number to a set-top box client. Thus, in a legacy broadcast system, the issue that arises is the assignment of a service group to each set-top box when there are no switched edge QAM devices to distinguish the service groups, thereby allowing the set-top boxes to benefit from the advantages provided by a switched digital system.

There is a demand for a method and system to assign a service group to a set-top box where no switched edge QAM devices are visible to the in-band tuner. The presently disclosed invention satisfies this demand.

SUMMARY

Aspects of the present invention provide a broadcast system and method that includes a video content network that connects a video server, a discovery server, a switched digital video service, a switched video manager, and a set-top box. The set-top box receives and stores an assigned location identifier. The set-top box receives a mapping from the discovery server, where the mapping includes records, each record associating a location identifier and a service group. The set-top box matches the assigned location identifier to the mapping to determine an assigned service group for the set-top box. The set-top box receives an address from the discovery server that identifies the switched video manager that is associated with the assigned service group. The set-top box operates in the broadcast system by communicating with the switched digital video service, and the switched video manager.

BRIEF DESCRIPTION OF THE DRAWINGS

FIG. 1 is a network diagram that illustrates one embodiment of the hardware components of a system that performs the present invention.

FIG. 2 is a block diagram that illustrates, in detail, one embodiment of the hardware components shown in FIG. 1.

FIG. 3 is a message flow diagram that illustrates methods according to various embodiments of the present invention.

DETAILED DESCRIPTION

FIG. 1 is a network diagram that illustrates one embodiment of the hardware components of a system that performs the present invention. A broadcast system 100 includes a network 110 and a hybrid fiber-coaxial (HFC) network 150. The HFC network 150 is a data and video content network that connects a gateway, such as a cable television head end 120, to a switched digital video (SDV) cluster 130, discovery server 140, and subscriber location 170. The broadband network 100 shown in FIG. 1 may include any number of interconnected networks 110, head ends 120, SDV clusters 130, discovery servers 140, HFC networks 150, and subscriber locations 170.

The head end 120, in one embodiment, is a cable television master head end facility for receiving television signals for processing and distribution over a cable television system. The head end 120 provides the subscriber location 170 with a variety of services and/or connections, such as the connection to the network 110. For example, the head end 120 may provide a connection to external services such as video servers, public switched telephone network voice, multimedia messages, and internet data. The head end 120 includes a user interface, such as a digital addressable controller (DAC) 125, to allow an operator to configure the head end 120 components, and define channel map assignments and Federal Information Processing Standard (FIPS) codes.

The switched video operations manager (SVOM) 132, edge resource manager (ERM) 134, and switched video manager (SVM) 136 are the components comprising the SDV cluster 130 for the broadcast system 100. The SVOM 132 is a computing device, including a processor and memory, which configures, monitors, and collects data from the ERM 134 and SVM 136 components. A cable operator uses the SVOM 132 to configure channels for SDV services, manage service group mappings, and administer the ERM 134, SVM 136, and edge QAM device (not shown) relationships. The SVOM 132 also collects usage and statistics information from set-top boxes 180. This allows cable operators to centrally measure important information and generate reports on critical operational topics, including channel usage, set-top box 180 usage, channel change rates, and service group bandwidth utilization. The ERM 134 is a computing device, including a processor and memory, which manages the edge QAM device relationships in the head end 120 as established by the cable operator's policies. The ERM 134 receives requests for edge QAM devices, and selects the appropriate edge QAM device to satisfy the bandwidth requirements of the request. The SVM 136 is a computing device, including a processor and memory, which manages the SDV streams that are active at any given time, and directs each stream to the appropriate set-top box 180 that requested the stream. The SVM 136 also tracks the channels viewed by each set-top box 180, and communicates with the ERM 134 to establish the requested channels.

The discovery server 140 is a searchable registry of components and services accessible in the broadcast system 100. In one embodiment, the discovery server 140 is a Domain Name System (DNS) server that the set-top box 180 can query for a well known or advertised (e.g., carouseled) SDV service identifier. In another embodiment, the discovery server 140 is a ubiquitous DNS server such as BIND.

The subscriber location 170 includes a computing device, such as a set-top box 180, to receive, decode and display data and video content, and provide access to the services and/or connections that the head end 120 provides. A service group 160 is an organization that includes a number of subscriber locations 170, each subscriber location 170 including one or more set-top boxes 180. A unique identifier associated with each service group 160, subscriber location 170, and/or set-top box 180 supports the functionality and advantages provided by the head end 120, SDV cluster 130, and discovery server 140.

In one embodiment shown in FIG. 1, the broadcast system 100 is a switched digital video (SDV) broadcast system. In the switched broadcast system 100, the SDV cluster 130 manages a set of edge QAM devices (not shown) that the broadcast system 100 bind and unbind to particular services based on requests from the set-top boxes 180 at the subscriber locations 170. The SDV cluster 130 monitors the requests that the set-top boxes 180 send to measure viewership. When a viewer decides to change the channel, the set-top box 180 sends a channel change message that the SVM 136 monitors. The SVM 136 parses the channel change message to obtain an identifier of the service group 160, subscriber location 170, and/or set-top box 180 that identifies the set of switched QAM devices visible to the set-top box 180. Typically, a set-top box 180 assigns the identifier via an in-band carousel, or a message exchange with the SVM 136 known as auto-discovery. In a typical switched broadcast system 100, the SDV cluster 130 uses the identifier to bind the requested channel to an edge QAM device visible to the service group.

In another embodiment shown in FIG. 1, the broadcast system 100 is a legacy, non-switched, broadcast system. In the non-switched broadcast system 100, since there is an excess of bandwidth, switched edge QAM devices (not shown) are not yet necessary. However, the SDV cluster 130 can still provide value to the subscribers in the non-switched broadcast system 100 because it can provide channel change statistics and reporting. In addition, when the non-switched broadcast system 100 combines the channel change data with an electronic program guide (EPG), the cable operator obtains a very accurate description of the viewership for every channel on the cable plant. In the non-switched broadcast system 100, the SDV cluster 130 does not manage the edge QAM devices, but it still assigns and supports an identifier of the service group 160, subscriber location 170, and/or set-top box 180. This allows the SDV cluster 130 to still use standard protocols (e.g., ISA and NGOD), while also maintaining a similar code base for both switched and non-switched deployments. In the non-switched broadcast system 100, the identifier of the service group 160, subscriber location 170, and/or set-top box 180 has value to the cable operators, and third parties such as advertisers, because the SDV cluster 130 can generate reports based on the identifier. These reports are particularly valuable if the cable operators and third parties use the identifier to represent a designated market area (DMA), or other geographic area. The geographic boundaries of a service group in a switched broadcast system 100 depend on the reach of associated switched edge QAM devices, but the boundaries of interest to the cable operators and third parties will likely correspond to a narrower geographic region.

The network 110 shown in FIG. 1, in one embodiment, is a public communication network or wide area network (WAN) that connects to the head end 120. The present invention also contemplates the use of comparable network architectures. Comparable network architectures include the Public Switched Telephone Network (PSTN), a public packet-switched network carrying data and voice packets, a wireless network, and a private network. A wireless network includes a cellular network (e.g., a Time Division Multiple Access (TDMA), Code Division Multiple Access (CDMA), or Orthogonal Frequency Division Multiplexing (OFDM) network), a satellite network, and a wireless Local Area Network (LAN) (e.g., a wireless fidelity (Wi-Fi) network). A private network includes a LAN, a Personal Area Network (PAN) such as a Bluetooth network, a wireless LAN, a Virtual Private Network (VPN), an intranet, or an extranet. An intranet is a private communication network that provides an organization such as a corporation, with a secure means for trusted members of the organization to access the resources on the organization's network. In contrast, an extranet is a private communication network that provides an organization, such as a corporation, with a secure means for the organization to authorize non-members of the organization to access certain resources on the organization's network. The system also contemplates network architectures and protocols such as Ethernet, Token Ring, Systems Network Architecture, Internet Protocol, Transmission Control Protocol, User Datagram Protocol, Asynchronous Transfer Mode, and proprietary network protocols comparable to the Internet Protocol.

The HFC network 150 is a broadband network that combines optical fiber and coaxial cable, technology commonly employed globally by cable television operators since the early 1990s. The fiber optic network extends from the cable operators master head end, sometimes to regional head ends, and out to a neighborhood hubsite, and finally to a fiber optic node that serves anywhere from 25 to 2000 homes. The master head end will usually have satellite dishes for reception of distant video signals as well as IP aggregation routers. Some master head ends also house telephony equipment for providing telecommunications services to the community. The regional head ends receive the video signal from the master head end and add to it the Public, Educational and/or Governmental (PEG) channels as required by local franchising authorities or insert targeted advertising that would appeal to the region. The various services are encoded, modulated and up-converted onto RF carriers, combined onto a single electrical signal and inserted into a broadband optical transmitter. This optical transmitter converts the electrical signal to a downstream optically modulated signal that is sent to the nodes. Fiber optic cables connect the head end to optical nodes in a point-to-point or star topology, or in some cases, in a protected ring topology.

FIG. 2 is a block diagram that illustrates, in detail, one embodiment of the hardware components shown in FIG. 1. In particular, FIG. 2 illustrates the hardware components and software comprising the set-top box 180 shown in FIG. 1.

The set-top box 180, in one embodiment, is a general-purpose computing device that performs the present invention. A bus 205 is a communication medium that connects a processor 210, data storage device 215 (such as a Serial ATA (SATA) hard disk drive, optical drive, Small Computer System Interface (SCSI) disk, flash memory, or the like), communication interface 220, infrared (IR) interface 225, video output processing 235, and memory 250 (such as Random Access Memory (RAM), Dynamic RAM (DRAM), non-volatile computer memory, flash memory, or the like). The communication interface 220 connects the set-top box 180 to the HFC network 150. The IR interface 225 connects the set-top box 180 to a remote controller 230. The video output processing 235 connects the set-top box 180 to a display device such as a television 240, and sends the video content that the television 240 screen displays. In one embodiment, the implementation of the set-top box 180 is an application-specific integrated circuit (ASIC).

The processor 210 performs the disclosed methods by executing the sequences of operational instructions that comprise each computer program resident in, or operative on, the memory 250. The reader should understand that the memory 250 may include operating system, administrative, and database programs that support the programs disclosed in this application. In one embodiment, the configuration of the memory 250 of the set-top box 180 includes an application program 251, SDV client program 252, and assigned location identifier 253. The application program 251 provides the viewer with access to basic functions, such as the display of a video content stream on the television 240, and advanced functions, such as video-on-demand (VOD), interactive television, and other next-generation television application programs. The SDV client program 252 is a program that interfaces with the SDV cluster 130 and discovery server 140. The SDV client program 252 enables the SDV cluster 130 and discovery server 140 to centrally measure important information and generate reports on critical operational topics, including channel usage, set-top box 180 usage, channel change rates, and service group bandwidth utilization. The assigned location identifier 253 is an identifier that associates the set-top box 180 to a location, such as a service group 160 or subscriber location 170. The application program 251, SDV client program 252, and assigned location identifier 253 perform the methods of the present invention disclosed in detail in FIG. 3. When the processor 210 performs the disclosed methods, it stores intermediate results in the memory 250 or data storage device 215. In another embodiment, the memory 250 may swap these programs, or portions thereof, in and out of the memory 230 as needed, and thus may include fewer than all of these programs at any one time.

FIG. 3 is a flow diagram that illustrates a method according to one embodiment of the present invention. In particular, FIG. 3 illustrates the communication between the SDV cluster 130, discovery server 140, and the set-top box 180.

The process 300 shown in FIG. 3, with reference to FIG. 1 and FIG. 2, begins with an operator at a head end 120 assigning a location identifier to the set-top box 180 (step 305). In one embodiment, the operator uses the digital addressable controller 125 in the head end 120 to send the location identifier to the set-top box 180. The set-top box 180 receives and stores the location identifier (step 310). In one embodiment, the set-top box 180 stores the location identifier in the assigned location identifier 253 segment of the memory 250. In one embodiment, the location identifier is a FIPS code, zip code, or Designated Market Area (DMA) code that associates the service group 160 or subscriber location 170 to a set-top box 180. When the location identifier is a FIPS code, the location identifier is, for example, "042091".

After assigning the location identifier, the process 300 requests a well known or advertised (e.g., carouseled) SDV service identifier (step 315). In one embodiment, the request is for a well known or advertised (e.g., carouseled) SDV service identifier. In another embodiment, the request is sent to a Domain Name System (DNS) as the discovery server 140. In one exemplary DNS embodiment, the request is a standard DNS query for an SDV service identifier, where the record type is TXT, and the domain name is "svm.testdomain.com". After receiving the query, the discovery server 140 prepares a mapping of location identifiers to service groups 160 or subscriber locations 170. In one embodiment, the mapping provides the set-top box 180 with a list of service groups based on location identifiers for every set-top box 180 in the broadcast system. In the exemplary DNS embodiment, the mapping is "042091=100", "042092=101", "042093=102", "042094=103", and "042095=104". In one embodiment, when the mapping includes more mappings than will fit in a single DNS message, the DNS server will set a bit in the DNS response message that indicates that more records are available. This will allow a virtually unlimited number of records in the response. The discovery server 140 sends the mapping in response to the query (step 320). When the set-top box 180 receives the mapping, it matches the assigned location identifier 253 to the mapping (step 325) to determine an identifier of the assigned service group 160 or subscriber location 170 for the set-top box 180. In the exemplary DNS embodiment, the set-top box 180 obtains the associated assigned service group 160 as "100". The set-top box 180 uses the associated assigned service group 160 to send a second request to the discovery server 140 for an address of the SVM associated with the service group 160 (step 330). In one embodiment, the address is internet protocol (IP) address. In the exemplary DNS embodiment, the second request is a standard DNS query for an IP address, where the record type is A, and the domain name is "sg100.svm.testdomain.com". The discovery server 140 receives the second request (step 335), and sends the address for the SVM (step 340). In the exemplary DNS embodiment, the reply is a DNS reply, where type is A, and the value is "10.0.0.1". The set-top box 180 receives the address for the SVM (step 345), and uses the SVM address to operate the set-top box in an SDV environment (step 350). In one embodiment, the operation of the set-top box 180 includes sending usage data to the switched digital video cluster 130, where the usage data includes channel usage data, set-top box 180 usage data, channel change data, and bandwidth utilization data.

Before a set-top box 180 can successfully complete the discovery process, the process 300, asynchronous to the service group 160 discovery, adds the correct mapping to the SDV cluster 130, and the discovery server 140. The SDV cluster 130 sends a request to add a mapping of location identifier to service group 160 or subscriber location 170 to the discovery server 140 (step 355). The discovery server 140 receives the request and adds the mapping (step 360). If the addition of the mapping is successful, the discovery server 140 sends a success response (step 365) that the SDV cluster 130 receives (step 370). In one embodiment, the SDV cluster 130 keeps the DNS discovery servers 140 up-to-date with service group 160 or subscriber location 170 mappings via Dynamic DNS (DDNS), which is supported today in ubiquitous DNS servers such as BIND. Furthermore, the use of DDNS alleviates the burden on operators to manually keep the DNS discovery server 140 in-sync with the configuration of the SDV cluster 130. In one embodiment, the updates to the discovery server 140 are secure updates using the transaction signature.

Although the disclosed embodiments describe a fully functioning method and system for assigning a service group to a set-top box where no switched edge QAM devices are visible to the in-band tuner, the reader should understand that other equivalent embodiments exist. Since numerous modifications and variations will occur to those reviewing this disclosure, the method and system for assigning a service group to a set-top box where no switched edge QAM devices are visible to the in-band tuner is not limited to the exact construction and operation illustrated and disclosed. Accordingly, this disclosure intends all suitable modifications and equivalents to fall within the scope of the claims.

We claim:

1. A method, comprising:
receiving an assigned location identifier for a set-top box;
receiving a mapping from a discovery server, the mapping having at least one record, each record associating a location identifier and a service group;
matching, by a computer, the assigned location identifier to the mapping to determine an assigned service group for the set-top box;
receiving an address from the discovery server, the address identifying a switched video management server that is associated with the assigned service group; and
operating the set-top box in a broadcast system by communicating with the switched digital video service, and the switched video management server.

2. The method of claim 1, wherein the receiving of the assigned location identifier further comprises:
receiving a configuration request message that includes the assigned location identifier; and
storing the assigned location identifier in the set-top box, wherein the assigned location identifier associates the set-top box with an assigned service group.

3. The method of claim 1, wherein the receiving of the mapping further comprises:
sending a first request to the discovery server, the first request including an identifier of a switched digital video service; and
receiving a first response from the discovery server, wherein the first response is to the first request, and includes the mapping.

4. The method of claim 3, wherein the identifier of the switched digital video service is well known or advertised.

5. The method of claim 1, wherein the matching of the assigned location identifier further comprises:
comparing the assigned location identifier to each location identifier in the mapping,
wherein the assigned service group is the service group associated with the location identifier that matches the assigned location identifier.

6. The method of claim 1, wherein the receiving of the address further comprises:
sending a second request to the discovery server, the second request including the assigned service group; and
receiving a second response from the discovery server, wherein the second response is to the second request, and includes the address.

7. The method of claim 1, wherein the operating of the set-top box further comprises:
sending at least one of channel usage data, set-top box usage data, channel change data, and bandwidth utilization data.

8. The method of claim 1, wherein the broadcast system includes the switched digital video service, the discovery server, and the switched video management server.

9. The method of claim 8, wherein the broadcast system is a switched digital video broadcast system.

10. The method of claim 8, wherein the broadcast system is a non-switched digital video broadcast system.

11. A broadcast system, comprising:
a video content network that connects a video server, a discovery server, a switched digital video service, and a switched video management server;
a computing device connected to the video content network and a video display device, the computing device comprising:
a memory device resident in the computing device; and
a processor disposed in communication with the memory device, the processor configured to:
receive an assigned location identifier for the computing device;
receive a mapping from the discovery server, the mapping having at least one record, each record associating a location identifier and a service group;
match the assigned location identifier to the mapping to determine an assigned service group for the computing device;
receive an address from the discovery server, the address identifying the switched video management server that is associated with the assigned service group; and
operate the computing device by communicating with the switched digital video service, and the switched video management server.

12. The broadcast system of claim 11, wherein to receive the assigned location identifier, the processor is further configured to:
receive a configuration request message that includes the assigned location identifier; and
store the assigned location identifier in the set-top box, wherein the assigned location identifier associates the computing device with an assigned service group.

13. The broadcast system of claim 11, wherein to receive the mapping, the processor is further configured to:
send a first request to the discovery server, the first request including an identifier of the switched digital video service; and
receive a first response from the discovery server, wherein the first response is to the first request, and includes the mapping.

14. The broadcast system of claim 13, wherein the identifier of the switched digital video service is well known or advertised.

15. The broadcast system of claim 11, wherein to match the assigned location identifier, the processor is further configured to:
compare the assigned location identifier to each location identifier in the mapping,
wherein the assigned service group is the service group associated with the location identifier that matches the assigned location identifier.

16. The broadcast system of claim 11, wherein to receive the address, the processor is further configured to:
send a second request to the discovery server, the second request including the assigned service group; and
receive a second response from the discovery server, wherein the second response is to the second request, and includes the address.

17. The broadcast system of claim 11, wherein to operate the computing device, the processor is further configured to:
send at least one of channel usage data, set-top box usage data, channel change data, and bandwidth utilization data.

18. The broadcast system of claim 11, wherein the broadcast system is a switched digital video broadcast system.

19. The broadcast system of claim 11, wherein the broadcast system is a non-switched digital video broadcast system.

20. A non-transitory computer-readable medium, comprising computer-executable instructions that, when executed on a computing device, perform steps of:
receiving an assigned location identifier for a set-top box;
receiving a mapping from a discovery server, the mapping having at least one record, each record associating a location identifier and a service group;

matching the assigned location identifier to the mapping to determine an assigned service group for the set-top box;
receiving an address from the discovery server, the address identifying a switched video management server that is associated with the assigned service group; and
operating the set-top box in a broadcast system by communicating with the switched digital video service, and the switched video management server.

* * * * *